(12) United States Patent
Wellman et al.

(10) Patent No.: US 8,182,642 B2
(45) Date of Patent: May 22, 2012

(54) FLANGE ASSEMBLY

(75) Inventors: Ray Wellman, Vallejo, CA (US); Doug Williams, San Rafael, CA (US)

(73) Assignee: ATS Products, Inc., Richmond, CA (US)

( * ) Notice: Subject to any disclaimer, the term of this patent is extended or adjusted under 35 U.S.C. 154(b) by 166 days.

(21) Appl. No.: 12/198,253

(22) Filed: Aug. 26, 2008

(65) Prior Publication Data

US 2009/0052981 A1 Feb. 26, 2009

Related U.S. Application Data

(63) Continuation of application No. 11/156,036, filed on Jun. 16, 2005, now Pat. No. 7,488,010.

(60) Provisional application No. 60/670,931, filed on Apr. 12, 2005.

(51) Int. Cl.
*B29C 65/54* (2006.01)
*F16L 47/14* (2006.01)

(52) U.S. Cl. ........ 156/293; 156/158; 285/405; 285/412; 285/416

(58) Field of Classification Search .................. 285/405, 285/406, 410, 411, 412, 413, 414, 415, 416; 277/614; F16L 47/14
See application file for complete search history.

(56) References Cited

U.S. PATENT DOCUMENTS

| | | | |
|---|---|---|---|
| RE3,768 E | 12/1869 | Lawton et al. | |
| 545,877 A | 9/1895 | Curlett | |
| 1,762,766 A | 6/1930 | De Garay | |
| 2,353,883 A | 7/1944 | Dickey | |
| 2,360,159 A | 10/1944 | Peck | |
| 3,167,322 A * | 1/1965 | Aichroth | 277/453 |
| 3,226,138 A * | 12/1965 | Ellis | 285/332.3 |
| 3,253,841 A | 5/1966 | Ahmad | |
| 3,387,864 A | 6/1968 | Walters | |
| 3,473,833 A | 10/1969 | Bremer | |
| 3,512,805 A | 5/1970 | Glatz | |
| 3,531,133 A * | 9/1970 | Sheesley et al. | 277/611 |
| 3,600,010 A | 8/1971 | Downs et al. | |
| 3,630,549 A | 12/1971 | Grimm | |
| 3,639,677 A | 2/1972 | Bain | |
| 3,677,579 A | 7/1972 | La Vanchy | |
| 3,686,747 A | 8/1972 | Bagnulo | |
| 3,704,021 A * | 11/1972 | Barbarin et al. | 277/611 |
| 3,796,057 A | 3/1974 | Dougherty | |
| 3,834,965 A * | 9/1974 | Seiwart et al. | 156/294 |
| 4,043,857 A | 8/1977 | Byrne et al. | |

(Continued)

FOREIGN PATENT DOCUMENTS

EP 0 582 543 A1 2/1994

(Continued)

OTHER PUBLICATIONS

Merriam-Webster OnLine Dictionary, http://www.merriam-webster.com/dictionary/seat, 2 pages.*

(Continued)

*Primary Examiner* — Philip Tucker
*Assistant Examiner* — William Bell
(74) *Attorney, Agent, or Firm* — Kilpatrick Townsend & Stockton LLP

(57) ABSTRACT

A method is disclosed. The method includes obtaining a tubular structure having a passageway and comprising a fiber reinforced plastic material, and then attaching a flange structure comprising an aperture coupled to the tubular structure using an attachment element.

21 Claims, 4 Drawing Sheets

U.S. PATENT DOCUMENTS

| | | | |
|---|---|---|---|
| 4,363,505 A | | 12/1982 | Smith |
| 4,385,644 A | * | 5/1983 | Kaempen .................. 138/109 |
| 4,514,244 A | | 4/1985 | Shaefer et al. |
| 4,538,837 A | | 9/1985 | Cronk |
| 4,619,470 A | * | 10/1986 | Overath et al. .............. 285/55 |
| 4,702,498 A | * | 10/1987 | Mueller et al. ............... 285/55 |
| 4,706,364 A | * | 11/1987 | Aubry ........................ 29/458 |
| 4,813,457 A | * | 3/1989 | Offringa et al. ............. 138/109 |
| 5,298,299 A | * | 3/1994 | Shea ......................... 428/34.5 |
| 5,335,944 A | | 8/1994 | Mitsui et al. |
| 5,505,497 A | | 4/1996 | Shea et al. |
| 5,549,949 A | | 8/1996 | Williams et al. |
| 5,909,904 A | * | 6/1999 | Shea ........................... 285/405 |
| 5,961,154 A | | 10/1999 | Williams et al. |
| 5,981,629 A | | 11/1999 | Cork |
| 6,145,892 A | | 11/2000 | Weber |
| 6,213,522 B1 | | 4/2001 | Jacobson et al. |
| 6,322,111 B1 | | 11/2001 | Brady |
| 6,902,205 B2 | * | 6/2005 | Bouey et al. ................. 285/243 |
| 2001/0023734 A1 | * | 9/2001 | Tavakoli et al. ............... 156/60 |
| 2004/0058112 A1 | | 3/2004 | Williams et al. |

FOREIGN PATENT DOCUMENTS

JP     03169533 A   *   7/1991

OTHER PUBLICATIONS

Merriam-Webster OnLine Dictionary, http://www.merriam-webster.com/dictionary/seat, downloaded Dec. 2009, 2 pages.*

* cited by examiner

FLANGE ASSEMBLY

CROSS-REFERENCES TO RELATED APPLICATIONS

This application is a continuation of U.S. patent application Ser. No. 11/156,036, filed on Jun. 16, 2005, now U.S. Pat. No. 7,488,010 issued on Feb. 10, 2009, which claims priority to U.S. Provisional Application No. 60/670,931, filed on Apr. 12, 2005, which are all herein incorporated by reference in their entirety for all purposes.

BACKGROUND OF THE INVENTION

One conventional method for joining fiber-reinforced plastic air ducts includes forming a seal around pieces of duct. The seat may be formed by wrapping a fiber-reinforced resin material around the abutting ends of the adjoining duct pieces and curing the same. This seal permanently joins the duct pieces.

In some cases, the permanent joining of two duct pieces is undesirable. For example, in the semiconductor industry, process gases that are exhausted in the joined duct pieces may react and may form solids or semi-solids. These solids or semi-solids can clog up the duct pieces and shut down the exhaust system. To clean out the exhaust system, one needs to cut the joined duct pieces, and then clean out the clogged duct piece or replace the clogged duct piece with a new duct piece. The same type of seal can then be formed around the ends of the new duct piece to install it in the exhaust system.

The conventional process of replacing duct pieces in an existing exhaust system is time consuming. It is well known that a semiconductor fabrication facility is expensive to build. It is therefore important that any downtime caused by events such as clogged exhaust systems be minimized so that its utilization is maximized.

The duct replacement/cleaning process mentioned above is also difficult for workers to perform and uses many steps.

It would be desirable to provide for a simpler and less time-consuming solution to the above problems. Embodiments of the invention address these and other problems.

SUMMARY OF THE INVENTION

Embodiments of the invention are directed to flange assemblies, systems, and methods.

One embodiment of the invention is directed to a flange assembly comprising: a tubular structure comprising a passageway and comprising a fiber reinforced plastic material; a flange structure comprising an aperture coupled to the tubular structure; and an attachment element between the flange structure and the tubular structure.

Another embodiment of the invention is directed to a system comprising: a first flange assembly comprising (i) a first tubular structure comprising a passageway and comprising a fiber reinforced plastic material, (ii) a first flange structure coupled to the first tubular structure, and (iii) a first attachment element between the first flange structure and the first tubular structure; a second flange assembly comprising (i) a second tubular structure comprising a passageway and comprising a fiber reinforced plastic material, (ii) a second flange structure coupled to the second tubular structure, and (iii) a second attachment element between the second flange structure and the second tubular structure; and a retaining ring structure disposed between the first flange structure and the second flange structure.

Another embodiment of the invention is directed to a method comprising: obtaining a tubular structure comprising a passageway and comprising a fiber reinforced plastic material; and attaching a flange structure comprising an aperture to the tubular structure using an attachment element, wherein the flange structure and the tubular structure form a flange assembly.

These and other embodiments of the invention are described in further detail below.

BRIEF DESCRIPTION OF THE DRAWINGS

In the Figures, like numerals designate like elements.

DETAILED DESCRIPTION

Embodiments of the invention are directed to directed to tubular systems, methods for making the tubular systems, and flange assemblies that can be used in the tubular systems. In one embodiment, the tubular system may be used in an exhaust system that uses air ducts. The air ducts and tubular systems according to embodiments of the invention are preferably adapted to transport liquids or gases containing corrosive materials.

Although air ducts and duct systems are described in detail in this application, it is understood that embodiments of the invention are not limited to air ducts and duct systems. For example, embodiments of the invention can also be used in piping systems that are used to transport liquids such as corrosive liquids.

One specific embodiment is directed to a tubular system. The tubular system comprises a first flange assembly comprising (i) a first tubular structure comprising a passageway and comprising a fiber reinforced plastic material, (ii) a first flange structure coupled to the first tubular structure, and (iii) a first attachment element between the flange structure and the first tubular structure. The system also includes a second flange assembly comprising (i) a second tubular structure comprising a passageway and comprising a fiber reinforced plastic material, (ii) a second flange structure coupled to the second tubular structure, and (iii) a second attachment element between the flange structure and the second tubular structure. A retaining ring structure is disposed between the first flange assembly and the second flange assembly. Each of these components is described in further detail below.

Figure 1A:
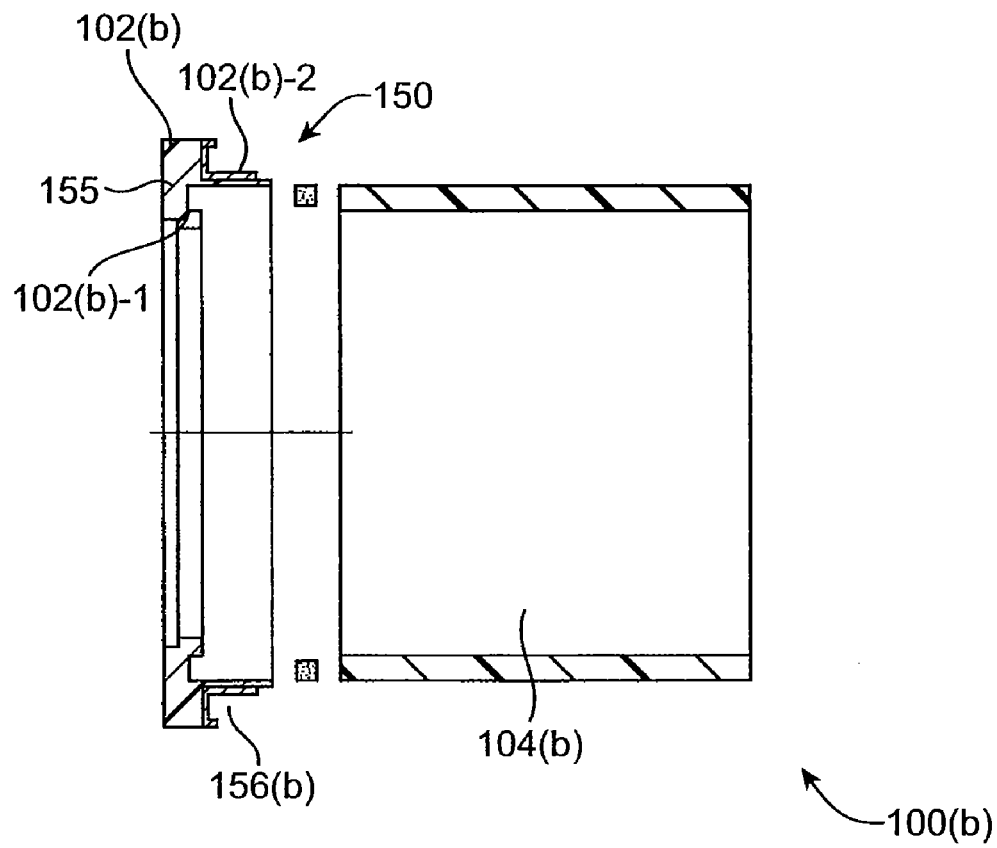
FIG. 1(a) shows an exploded view of parts of a flange assembly according to an embodiment of the invention.

FIG. 1(a) shows components of an exploded view of a flange assembly 100(b) according to an embodiment of the invention. The flange assembly 100(b) includes a flange structure 102(b) and a tubular structure 104(b). One flange structure 102(b) is shown at one end of the tubular structure 104(b). In other embodiments, flange structures may be at both ends of the tubular structure 104(b).

The tubular flange structure 102(b) and the tubular structure 104(b) may have any suitable shape. For example, either or both may have a circular, oval, or rectangular section or shape. The tubular structure 104(b) may be a cylindrical structure, a parallelpiped structure, etc. Some examples of suitable tubular structures can be found in U.S. patent application Ser. No. 10/916,749, filed on Aug. 11, 2004, which is herein incorporated by reference in its entirety.

An attachment element 150 is between the tubular structure 104(b) and the flange structure 102(b). When assembled together, the flange assembly 100(b) includes a tubular section formed by the tubular structure 104(b) and a flange formed by the flange structure 102(b). The flange structure 102(b) provides the tubular structure 104(b) with a flange so that the formed flange assembly 100(b) can be easily coupled to another flange assembly.

The flange structure 102(b) may have an aperture and may be in the form of a ring. It may have an inner ring-shaped seat 102(b)-1 and an outer ring-shaped seat 102(b)-2. The seats 102(b)-1, 102(b)-2 may have any suitable dimensions.

The inner seat 102(b)-1 receives an end of the tubular structure 104(b) and is preferably cooperatively structured with respect to the end of the tubular structure 104(b). An attachment element 150 may couple the end of the tubular structure 104(b) and the flange structure 102(b) together.

The outer seat 102(b)-2 extends radially outward from the inner seat 102(b)-1. The outer seat 102(b)-2 can receive ends of C-clamps (not shown) or some other coupling mechanism.

The attachment element 150 in this example is a ring of an adhesive that is placed on the end of the tubular structure 104(b) and/or in the outer seat 102(b)-2. The adhesive may be an epoxy-based adhesive that may bond metal to a fiber reinforced plastic material. Suitable adhesives are described in U.S. Pat. No. 5,549,949, which is herein incorporated by reference in its entirety for all purposes. In other embodiments, other attachment elements may be used.

The flange structure 102(b) may be formed of any suitable material. Suitable materials include metal and fiber-reinforced plastic materials. The flange structure 102(b) preferably comprises two or more parts, at least one part being made of a metal such as aluminum (or stainless steel) and another part being made of a composite plastic material.

The flange structure 102(b), and any parts making up the flange structure 102(b) may be formed in any suitable manner. For example, a block of aluminum or a block of a fiber-reinforced plastic composite material may be molded or milled using conventional milling processes to create the flange structure shown in FIG. 1. Accordingly, the flange structure 102(b) could be a monolithic body in some embodiments. In other embodiments, the flange structure is made of separate parts with dissimilar materials.

Figure 1B:
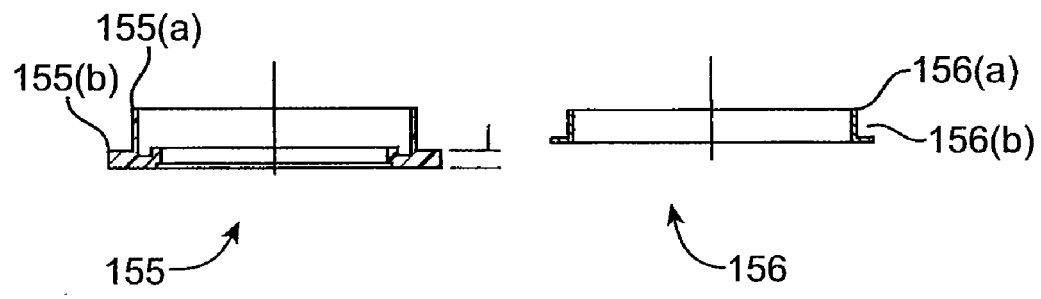
FIG. 1(b) shows two parts of a flange structure according to an embodiment of the invention.

FIG. 1(b) shows a flange structure embodiment that includes two separate parts made of dissimilar materials. The flange structure includes a flange base 155 and a flange clamp ring section 156. The flange base 155 has an inner ring portion 155(a) and an outer flange portion 155(b). The outer flange portion 155(b) extends radially outward from the inner ring portion 155(a). The flange base 155 is preferably made of a fiber-reinforced plastic material (e.g., a phenolic fiber reinforced resin). Examples of fiber-reinforced plastic materials are mentioned below.

The flange clamp ring section 156 comprises a metallic material such as stainless steel or aluminum. It has an inner ring portion 156(a) and an outer flange portion 156(b) that extends radially outward from the inner ring portion 156(a). In other embodiments, the flange clamp ring section 156 could be made of a fiber-reinforced composite material. This ring 156 may be referred to as a "load bearing channel ring" in some cases.

Together, the outer flange portion 156(b) of the flange clamp section 156 and the outer flange portion 155(b) of the flange base 155 can form a flange in the flange assembly 100(b). In this example, the flange clamp section 156 is disposed around the inner ring portion 155(a) of the flange base 155.

The flange clamp section 156 and the flange base 155 can be bonded together using a suitable adhesive (not shown). For example, the epoxy adhesives mentioned herein may be used to bond the flange clamp section 156 and the flange base 155 together. The aperture in the flange base 155 provides a passage for gases or liquids, while the flange clamp section 156 provides the flange base 155 and the flange structure 102(b) with added structural stability.

Figure 2:
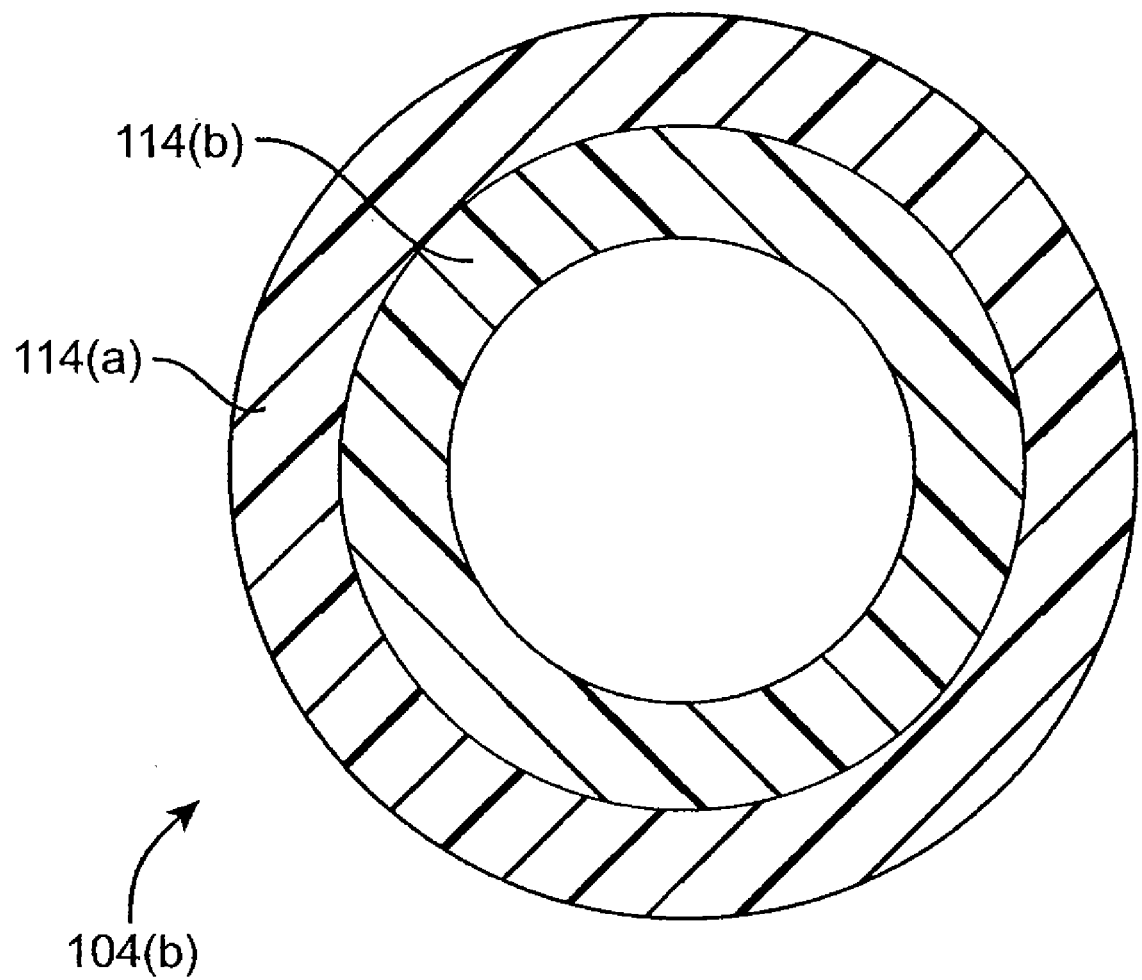
FIG. 2 shows a cross-section of a tubular structure that can be used in embodiments of the invention.

FIG. 2 shows a radial cross-section of a tubular structure 104(b) according to an embodiment of the invention. The tubular structure 104(b) has a first layer outer layer 114(a) and a second inner layer 114(b). The outer layer 114(a) may be fire-resistant while the second inner layer 114(b) may be corrosion resistant. The outer layer 114(a) and the inner layer 114(b) may have any suitable thickness. Other layers may also be present. For example, there may be a fluoropolymer layer liner in the tubular structure 104(b).

Suitable corrosion-resistant materials that may be used in the inner layer 114(b) may include vinyl ester resins. Vinyl ester resins are preferably used because of their superior chemical resistance. Suitable vinyl ester resins are commercially available under the tradename Derkane® (e.g., Derakane® 510A) , by Dow Chemical Inc. of Midland, MI.

Suitable fire-resistant resins that can be used in the outer layer 114(a) include phenolic resins. In other embodiments, a phenolic resin such as a phenol-aldehyde resin may be used. A suitable phenol-aldehyde resin is commercially available from Borden Chemical, Inc. Other exemplary resins include resorcinol-aldehyde, or phenol-resorcinol-aldehyde based resin systems.

In some cases, the resins used in the inner and outer layers 114(a), 114(b) may be translucent or transparent to allow one to see inside of the formed tubular structures. In addition, resins used to form the above-described flange structure may also comprise a translucent or transparent resin material.

Each layer 114(a), 114(b) includes a fabric material in addition to a resin material. For example, the fabric material may be glass, random glass mat, woven roving, boat cloth, filament winding, or organic (or inorganic) veils as subsequent layers of glass in order to achieve the desired wall thicknesses. For some applications, the aforesaid fabric materials may be impregnated with graphite or carbon fibers or even ceramic fibers to provide increased strength and fire resistance.

The two layer tubular structure 104(b) may be formed by wrapping a fabric around a mandrel and then saturating the fabric with a vinyl ester resin. This layer is then cured, and then a second layer of resin-saturated fabric is wrapped around the cured vinylester and fabric layer. The resin in the second layer may comprise a phenolic resin as mentioned above. The second layer is then cured. Once the second layer is cured, the two layer structure is formed and is taken off of the mandrel. Those of ordinary skill in the art know of suitable processing conditions.

An exemplary method for forming a flange assembly can be described with reference to FIGS. 1(a)-1b). Referring to FIGS. 1(a) and 1(b), the tubular structure 104(b) may first be formed as described above. The flange base 155 and a flange clamp ring section 156 may then be formed as described above. The flange clamp ring section 156 may then be attached to the flange base 155 with an adhesive, and the combined flange clamp ring section 156 and flange base 155 may be attached to the tubular structure with an attachment element 150 such as an adhesive.

Figure 3:
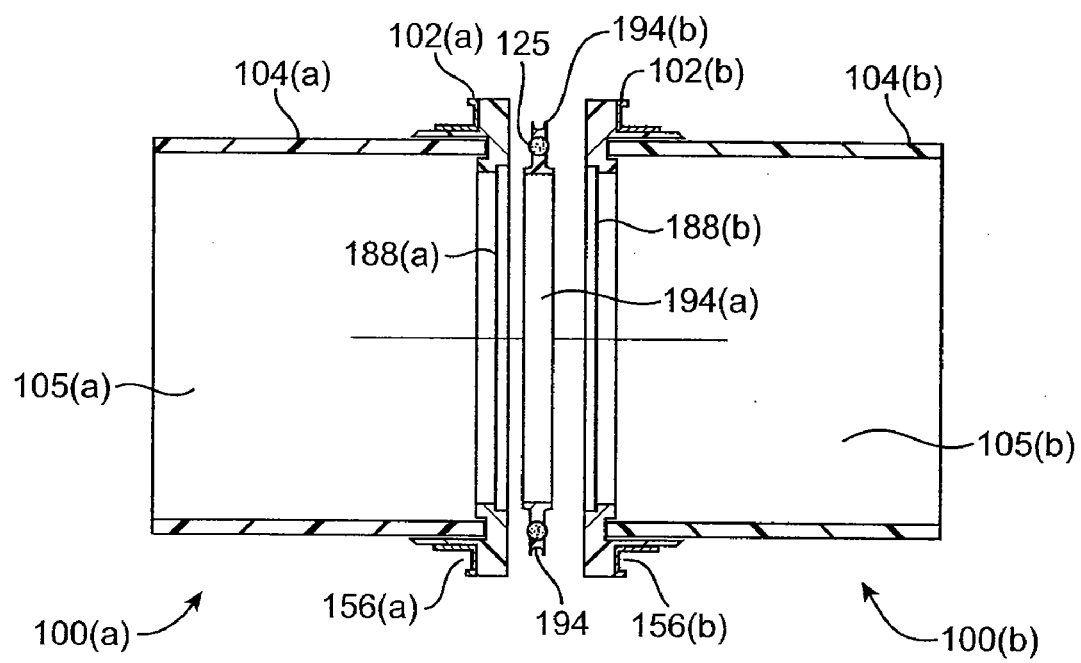
FIG. 3 shows a side cross-sectional view of a tubular system according to an embodiment of the invention in an unassembled state without clamps.

FIG. 3 shows a first flange assembly 100(a) including a first tubular structure 104(a) and a first flange structure 102(a), and second flange assembly 100(b) including a second tubular structure 104(b) and a second flange structure 102(b). The first and second tubular structures 104(a), 104(b) form passageways 105(a), 105(b).

A retaining ring structure 194 and an O-ring gasket 125 are between the first and second flange structures 102(a), 102(b). A central inner portion 194(a) of the retainer ring structure 194 is inside of an outer portion 194(b). The inner central portion 194(a) may comprise a fiber-reinforced plastic material. This shields the gasket 125 from any corrosive fluids passing through joined tubular structures. The outer portion 194(b) may be a stainless steel ring with an inner groove that receives the gasket 125. The gasket 125 can therefore be sandwiched between the inner portion 194(a) and the outer portion 194(b). Although the retaining ring structure 194 is shown as including two separate parts (i.e., 194(a), 194(b)) in this example, it can be of one piece construction in other embodiments. As shown in FIG. 3, the facing faces of the flange assemblies 100(a), 100(b) have shallow grooves 188(a), 188(b) that are cooperatively structured with the central portion 194(a) of the retaining ring structure 194.

The retaining ring structure 194 and the O-ring gasket 125 ensure that there is a tight seal between the flat facing faces of the first and second flange structures 102(a), 102(b). The O-ring gasket 125 may be made of a fluoroelastomer, such as Viton®, or some other suitable material. In this example, the O-ring gasket 125 sits in the middle of two concentric circular parts forming the retaining ring structure 194.

Figure 4:
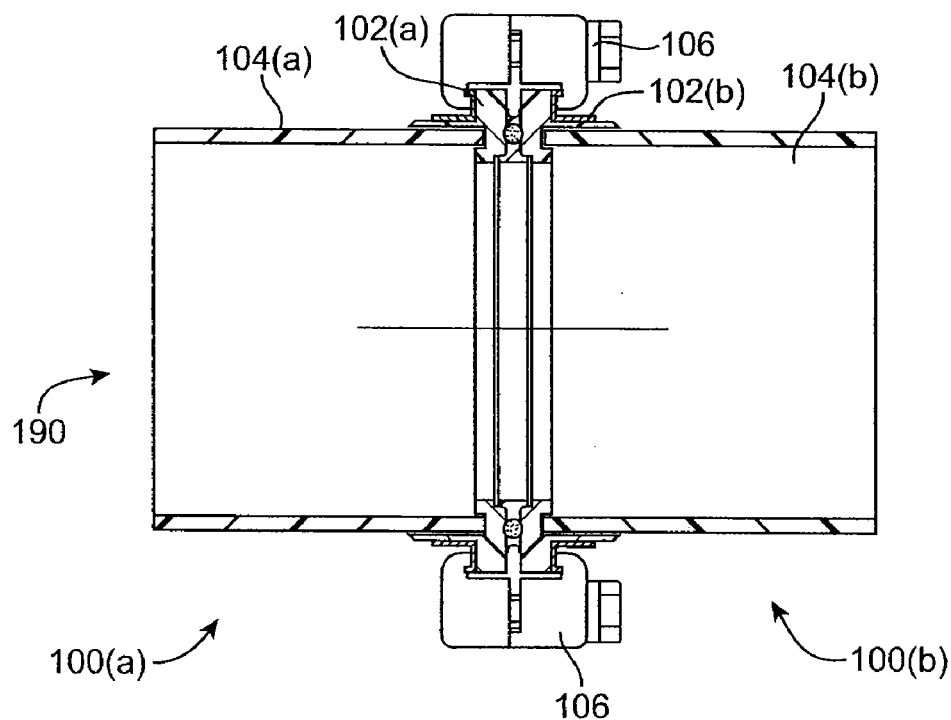
FIG. 4 shows a side cross-sectional view of the system in FIG. 3 in an assembled state.

FIG. 4 shows an assembled tubular system 190 according to an embodiment of the invention. C-clamps securely couple the first and second flange assemblies 100(a), 100(b) together via the first and second flange structures 102(a), 102(b) to seal two adjacent tubular sections 104(a), 104(b) together. In other embodiments, nuts and bolts can pass through the abutting flanges of the flange assemblies 100(a), 100(b). Holes (not shown) may be formed in the abutting flanges of the flange assemblies 100(a), 100(b) to allow for the use of nuts and bolts as a securing mechanism.

In an exemplary assembly process, the flange assemblies 100(a), 100(b) are formed as described above. The O-ring gasket 125 is placed in the retainer ring 194, and this combination is placed between the flange assemblies 100(a), 100(b). Then, a plurality of clamps 106 may be positioned so that their ends sit in opposing seats 156(a), 156(b) in the flange structures 102(a), 102(b).

Other embodiments are also possible. For example, in some embodiments, the O-ring gasket could be embedded in a groove in a flange face. For example, the outer flange portion 155(b) in FIG. 1(b) could have a groove or ledge which receives an O-ring gasket or some other gasket structure. This would allow one to omit the retaining ring structure 194 which holds the O-ring in position in the above described embodiments. In some cases, a slip centering ring could be employed as an alignment ring and the O-ring is seated in the flange face and the flanges are sealed face to face for use in high pressure applications.

Figure 5:
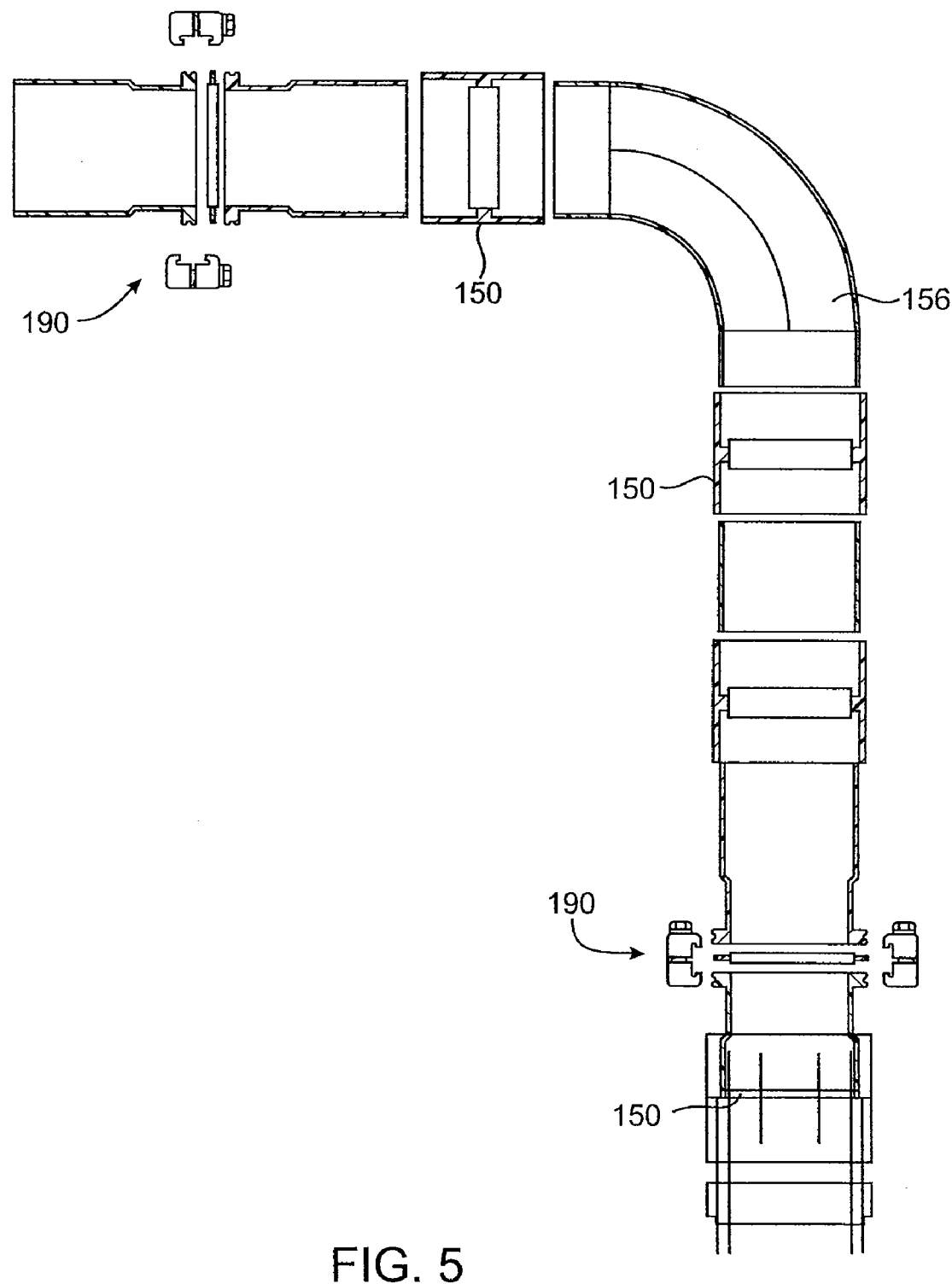
FIG. 5 shows an exhaust system according to another embodiment of the invention.

FIG. 5 shows an exhaust system according to an embodiment of the invention. The exhaust system includes the previously described tubular systems 190. The tubular systems 190 are coupled to slip collars with H-shaped cross sections 150. Slip collars with H-shaped cross-sections are described in U.S. patent application Ser. No. 10/368,028, filed on Feb. 19, 2003, and U.S. patent application Ser. No. 10/765,707 filed on Jan. 26, 2004. Both of these applications are herein incorporated by reference in their entirety for all purposes. The slip collars with H-shaped cross-sections 150 couple a curved duct piece 156. Another slip collar 150 joins the tubular systems 190 to an exhaust duct.

Embodiments of the invention have number of advantages. For example, the flange assemblies according to embodiments of the invention may be easily connected or disconnected from other flange assemblies. For example, as described above, to connect two flange assemblies together, simple clamps, bolts, or the like may be used. To disconnect the two flange assemblies, the clamps, bolts, or the like may be removed and the flange assemblies can be separated. Unlike conventional duct joining methods and systems, one need to destroy a previously formed joint to remove a clogged piece of duct in an exhaust system. Also, embodiments of the invention are easy to use and fabricate, and also provide for a tight seal between adjacent duct sections. For instance, instead of conventional methods which include cutting duct pieces, forming a new seal with resin, and curing, embodiments of the invention can use a simple mechanical disconnect mechanism to remove a clogged duct piece.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed.

Moreover, one or more features of one or more embodiments of the invention may be combined with one or more features of other embodiments of the invention without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:

obtaining a tubular structure comprising an outer layer, an inner layer, a cross-section end, a passageway defined by the inner layer, and a fiber reinforced plastic material; and attaching a flange structure comprising a metal flange clamp ring section and a ring-shaped flange base, wherein the ring-shaped flange base has (i) an inner ring-shaped seat cooperatively structured with respect to the cross-section end of the tubular structure, (ii) a flange face, and (iii) an outer ring-shaped seat, to the tubular structure by placing the cross-section end of the tubular structure in the inner ring-shaped seat, wherein attaching the flange structure to the tubular structure further comprises applying an adhesive to the cross-section end of the tubular structure, applying an adhesive to the inner-ring shaped seat, and seating the cross-section end of the tubular structure into the inner-ring shaped seat, wherein the flange structure and the tubular structure form a flange assembly, wherein the ring-shaped flange base comprises an inner ring portion defining an aperture and an outer flange portion coupled to the inner ring portion, wherein the outer ring-shaped seat of the flange structure extends radially outward away from a center of the aperture, wherein the metal flange clamp ring section is disposed on the outer flange portion of the flange base and forms the outer ring-shaped seat, wherein the inner ring-shaped seat is formed in the ring-shaped flange base and is closer to the aperture than the outer flange portion and the outer ring-shaped seat, and wherein the flange face is disposed opposite the inner ring-shaped seat and comprises a flange face groove.

2. The method of claim 1 wherein the flange assembly is a first flange assembly and wherein the method further comprises attaching a second flange assembly to the first flange assembly using a clamp that has an end seated in the metal flange clamp ring section.

3. The method of claim 1, wherein the inner layer comprises a corrosion resistant resin material and wherein the outer layer comprises a fire resistant resin material.

4. The method of claim 1, wherein the inner layer comprises a corrosion resistant resin material comprising or being derived from a vinyl ester material and wherein the outer layer comprises a fire resistant resin material comprising or being derived from a phenol-aldehyde resin, resorcinol-aldehyde resin, or a phenol-resorcinol-aldehyde based resin.

5. The method of claim 1 wherein the flange structure comprises a fiber-reinforced plastic material.

6. The method of claim 1 wherein the adhesive comprises an epoxy adhesive.

7. The method of claim 1 wherein the flange structure consists of the ring-shaped flange base and the metal flange clamp ring section.

8. The method of claim 1 further comprising:
obtaining a retaining ring structure including a fiber-reinforced plastic inner portion, a metal outer portion, and a gasket wherein the gasket is disposed between the fiber-reinforced plastic inner portion and the metal outer portion;
placing the retaining ring structure between the first flange assembly and second flange assembly wherein the retaining ring structure is disposed in the flange face groove of the first flange assembly and a flange face groove of the second flange assembly.

9. The method of claim 1 further comprising obtaining a retaining ring structure and placing a portion of the retaining ring structure in the flange face groove.

10. The method of claim 9 wherein the retaining ring structure comprises a fiber-reinforced plastic inner portion and a stainless steel outer portion.

11. The method of claim 10 wherein the retaining ring structure further comprises an O-ring gasket.

12. The method of claim 1, wherein the inner ring-shaped seat is recessed into the ring-shaped flange base such that, after the tubular structure and the flange structure are attached, the cross-section end of the tubular structure contacts the inner ring-shaped seat.

13. The method of claim 1, wherein the ring-shaped flange base and the metal flange clamp ring section are bonded together using an adhesive.

14. The method of claim 1, wherein the passageway runs the length of the tubular structure and the cross-section end is formed by cutting the tubular structure perpendicular to the passageway.

15. The method of claim 1, wherein the cross-section end contacts the inner ring-shaped seat and the outer layer does not contact the inner ring-shaped seat after the cross-section end is seated.

16. A method comprising:
obtaining a first and a second tubular structure each comprising an end, a passageway, a corrosion resistant resin inner layer and a fire resistant resin outer layer;
attaching a first flange structure comprising a ring-shaped flange base, a metal flange clamp ring section, an inner ring-shaped seat cooperatively structured with respect to the end of the first tubular structure, a flange face, and an outer ring-shaped seat to the first tubular structure using an attachment element by placing the end of the first tubular structure in the inner ring-shaped seat,
wherein the first flange structure and the first tubular structure form a first flange assembly;
wherein the attachment element is an adhesive comprising an epoxy adhesive;
wherein the ring-shaped flange base comprises, an inner ring portion defining an aperture, and an outer flange portion coupled to the inner ring portion,
wherein the outer ring-shaped seat of the first flange structure extends radially outward away from a center of the aperture,
wherein the metal flange clamp ring section is disposed on the outer flange portion of the flange base and forms the outer ring-shaped seat,
wherein the inner ring-shaped seat is formed in the ring-shaped flange base and is closer to the aperture than the outer flange portion and the outer ring-shaped seat,
wherein the flange face is disposed opposite the inner ring-shaped seat and comprises a flange face groove,
wherein the first flange structure comprise a fiber-reinforced plastic material;
attaching a second flange structure to the second tubular structure, wherein the second flange structure and the second tubular structure form a second flange assembly;
obtaining a retaining ring structure, wherein the retaining ring structure comprises a fiber-reinforced plastic inner portion, a stainless steel outer portion, and a gasket wherein the gasket is disposed between the fiber-reinforced plastic inner portion and the stainless steel outer portion; and
placing the retaining ring structure between the first flange assembly and second flange assembly wherein at least a portion of the retaining ring structure is disposed in the flange face groove of the first flange assembly and a flange face groove of the second flange assembly.

17. The method of claim 16 further comprising:
attaching metal clamps to the metal flange clamp ring section.

18. The method of claim 16, wherein the fiber-reinforced plastic inner portion is configured to shield the gasket from corrosive materials that pass through the passageways of the first and second tubular structures.

19. The method of claim 16, wherein the fiber-reinforced plastic inner portion comprises a ridge, wherein the ridge is configured to fit into the flange face groove of the flange structure.

20. The method of claim 16, wherein the inner ring-shaped seat and the outer ring-shaped seat comprise J-shaped cross-sections.

21. A method comprising:
obtaining a tubular structure comprising an outer layer, an inner layer, a cross-section end, a passageway defined by the inner layer, and a fiber reinforced plastic material; and
attaching a flange structure comprising a metal flange clamp ring section and a ring-shaped flange base, wherein the ring-shaped flange base has (i) an inner ring-shaped seat cooperatively structured with respect to the cross-section end of the tubular structure, (ii) a flange face, and (iii) an outer ring-shaped seat, to the tubular structure placing the cross-section end of the tubular structure in the inner ring-shaped seat, wherein the passageway runs the length of the tubular structure and the cross-section end is formed by cutting the tubular structure perpendicular to the passageway, wherein an adhesive is placed on the cross-section end of the tubular structure and within the inner ring-shaped seat of the flange base, wherein the metal flange clamp ring section and the ring-shaped flange are bonded together using an adhesive, and wherein the flange face is disposed opposite the inner ring-shaped seat.

* * * * *